United States Patent [19]

Bissegger et al.

[11] Patent Number: 4,941,266
[45] Date of Patent: Jul. 17, 1990

[54] FEELER DEVICE FOR FORMING A MEASUREMENT VALUE WHEN SENSING A WORKPIECE

[75] Inventors: Marcel Bissegger, Safnern; Alain Stegmann, Biel, both of Switzerland

[73] Assignee: Saphirwerk Industrieprodukte AG, Biel, Switzerland

[21] Appl. No.: 314,098

[22] Filed: Feb. 23, 1989

[30] Foreign Application Priority Data

Mar. 11, 1988 [CH] Switzerland ............................ 923/88

[51] Int. Cl.⁵ .............................................. G01B 11/24
[52] U.S. Cl. ............................................. 33/556; 33/559
[58] Field of Search ................. 33/832, 503, 504, 505, 33/556, 558, 559, 561, 23.11

[56] References Cited

U.S. PATENT DOCUMENTS

| | | | |
|---|---|---|---|
| 3,250,012 | 5/1966 | Hilton et al. | 33/505 |
| 3,660,906 | 5/1972 | Zimmerman | 33/559 |
| 4,301,338 | 11/1981 | McMurtry | 33/556 |
| 4,516,327 | 5/1985 | Kanda et al. | 33/556 |
| 4,530,159 | 7/1985 | Ernst | 33/503 |
| 4,530,160 | 7/1985 | Feichtinger | 33/832 |
| 4,532,713 | 8/1985 | Feichtinger | 33/559 |
| 4,578,873 | 4/1986 | Klingler et al. | 33/556 |
| 4,679,332 | 7/1987 | Lüthi | 33/832 |
| 4,813,151 | 3/1989 | Hajdukiewicz et al. | 33/561 |
| 4,829,677 | 5/1989 | Yuzuru | 33/832 |

FOREIGN PATENT DOCUMENTS 3603269 8/1987 Fed. Rep. of Germany ........ 33/559

Primary Examiner—William A. Cuchlinski, Jr.
Assistant Examiner—Christopher W. Folton
Attorney, Agent, or Firm—Shoemaker and Mattare, Ltd.

[57] ABSTRACT

The feeler device has a housing in which a deflectable member is mounted by means of a ball element which can be pressed against a mounting means under a spring bias. A securing element is arranged either fixedly or displaceably in the ball element, the securing element engaging into a guide element at least in the neutral starting position. The guide element preferably comprises two parallel pins.

11 Claims, 3 Drawing Sheets

FEELER DEVICE FOR FORMING A MEASUREMENT VALUE WHEN SENSING A WORKPIECE

FIELD OF THE INVENTION

The invention relates to a feeler device for forming a measurement value when sensing a workpiece, comprising a housing with a measuring element arranged therein, and a member which can be deflected relative to the housing and which carries at least one feeler pin and which is mounted in the housing by means of a ball element which can be pressed against a mounting means, wherein the measuring element can be activated by displacement and/or deflection of the ball element.

DESCRIPTION OF THE PRIOR ART

Feeler devices of that kind are used in particular in connection with multi-co-ordinate measuring machines in which the workpiece is displaceable along a plurality of axes relative to the feeler device, wherein the distance travelled is measured and measurement pulses are outputted when the workpiece is sensed.

In that connection, the measuring machines may be provided with a switching feeler device in which the workpiece is sensed with an extremely low measuring force and the distance covered is detected in the co-ordinate system at the moment of the sensing operation. However, the measuring machines may also be provided with a measuring feeler device for continuously sensing surfaces, in which case the varying deflection of the feeler device is continuously measured and recorded. Many known feeler devices can be used for both modes of operation.

One problem involved in known apparatuses lies in particular in mounting the deflectable member in the housing of the feeler device. That mounting arrangement is subject to very high levels of requirement in regard to precision and operating characteristics thereof. Particularly in the case of three-co-ordinate measuring machines, the feeler pin is to be capable of displacement or deflection movement with a high degree of precision in the three axes without the mounting means suffering from play or excessive friction. Finally, however, the arrangement is also to be such that the movement of the feeler pin is transmitted as directly as possible to the measuring element without requiring expensive transmission elements and so forth. Proposed forms of mounting arrangements on multi-co-ordinate feeler devices are already disclosed in DE-B-22 42 355 or DE-B-27 12 181. However those systems are relatively expensive and are not unconditionally suitable for miniaturisation of the components.

US-A-3250012 discloses a feeler device in which the deflectable member is mounted in the housing by means of a portion of a ball which is pressed against a pivot mounting socket by a spring force. The feeler pin in that arrangement can be deflected in all directions or, in an operation which involves precisely axial sensing, it can also be displaced towards the interior of the housing. A slider which is pressed against a flat surface of the portion of a ball transmits any movement of the portion of the ball out of its neutral position to a measuring element. That mounting arrangement is highly advantageous in itself as it can be easily and precisely produced and as any movement of the feeler pin is converted into a linear movement which is easy to transmit to the measuring element. However, a disadvantage of that known mounting arrangement is that the deflection of the feeler pin in the X- and Y-axes is unguided and therefore can take place in an uncontrolled fashion. In addition, the feeler pin can turn in the mounting arrangement, which is undesirable when using star-shaped feeler pins and would give rise to incorrect measurement results.

SUMMARY OF THE INVENTION

It is therefore an object of the present invention to provide a feeler device of the kind set forth in the opening part of this specification, in which more precise measurement results can be achieved, while making use of the advantages of a spherical mounting arrangement. In particular the invention seeks to provide that deflection of the feeler pin occurs in a guided fashion and that the feeler pin is to be prevented from rotating both in relation to switching feeler devices and also in relation to measuring feeler devices in a continuous scanning mode.

According to the invention that object is achieved by a feeler device in which, in order to prevent the feeler pin from turning, the ball element is provided with a securing element which projects out of the ball element and which engages into a guide element at least in the neutral starting position of the deflectable member.

The securing element in the ball element means that it is possible to provide for a precise guiding action in the neutral starting position at least in one plane of deflection movement. In that connection, it is immaterial in relation to switching feeler devices if the above-indicated guiding action is nullified when deflection movement begins and the securing element is then no longer operatively connected to the guide element. More specifically, the measurement result is already stored fractions of a second after the deflection movement begins so that subsequent turning movement of the feeler pin is irrelevant. However, the arrangement according to the invention ensures that the feeler pin is mounted non-rotatably in the housing in its neutral starting position.

A particularly advantageous arrangement provides that the securing element is a cylindrical pin whose axis extends at a right angle to the center line of the deflectable member or the feeler member through the center point of the ball. It will be seen that, with that geometrical arrangement, the feeler pin can be deflected in a plane in such a way that the cylindrical pin rotates about its own axis. In so doing it remains in engagement with the guide element. That arrangement permits the feeler pin to be guided in the X- and Y-axes, without the need to have complicated rectilinear guidance systems as for example in the case of above-mentioned DE-B-22 42 355.

In a particularly simple construction the guide element comprises two parallel shaped members, between which the cylindrical pin of the securing element engages at least in the neutral starting position. It will be appreciated, however, that the cylindrical pin could also engage, for example, into a groove on the inside wall surface of the housing. However the parallel shaped members may be in the form of cylindrical pins, in a particularly simple and precise configuration. Engagement of the cylindrical pin of the securing element in that arrangement is further facilitated by the end thereof being of a conical configuration.

If the cylindrical pin is axially slideably mounted in the ball element and can be pressed against the guide element by means of a spring bias, the high-precision guiding effect can be maintained not just in the neutral starting position but also during a deflection movement. In that situation the conical end of the cylindrical pin is pressed in a play-free manner between the two pins of the guide element. The friction which is caused in that case is negligible and can be reduced by using a suitable taper angle. Further advantages are enjoyed in that arrangement if the cylindrical pin can be fixed with a screw. In that case, when the feeler device is used in a switching mode, the screw can firstly be loosened so that the cylindrical pin is pressed against the guide element in the neutral position of the feeler pin. The screw is tightened in that position so that, in the neutral starting position, the cylindrcial pin is always held without play between the two shaped members of the guide element. If there is a wish to provide a permanent guiding action in a scanning mode of operation, it will be appreciated that the fixing screw must be released so that the cylindrical pin is constantly pressed against the guide element.

The shaped members of the guide element are advantageously fixed in a ring which serves as a mounting means for the ball element. In that arrangement the ball element may be supported directly in the ring. However, a particularly high degree of precision is achieved by adopting a three-point mounting in which three mounting balls are arranged on the ring, with the ball element being supported on the mounting balls. The ring may be pressed into the housing at the feeler member end thereof, whereby it is possible to achieve a particularly high level of precision.

BRIEF DESCRIPTION OF THE DRAWINGS

Further individual features and advantages of the invention will be apparent from the following description and the accompanying drawings showing embodiments, in which.

DESCRIPTION OF PREFERRED EMBODIMENTS

Figure 1:
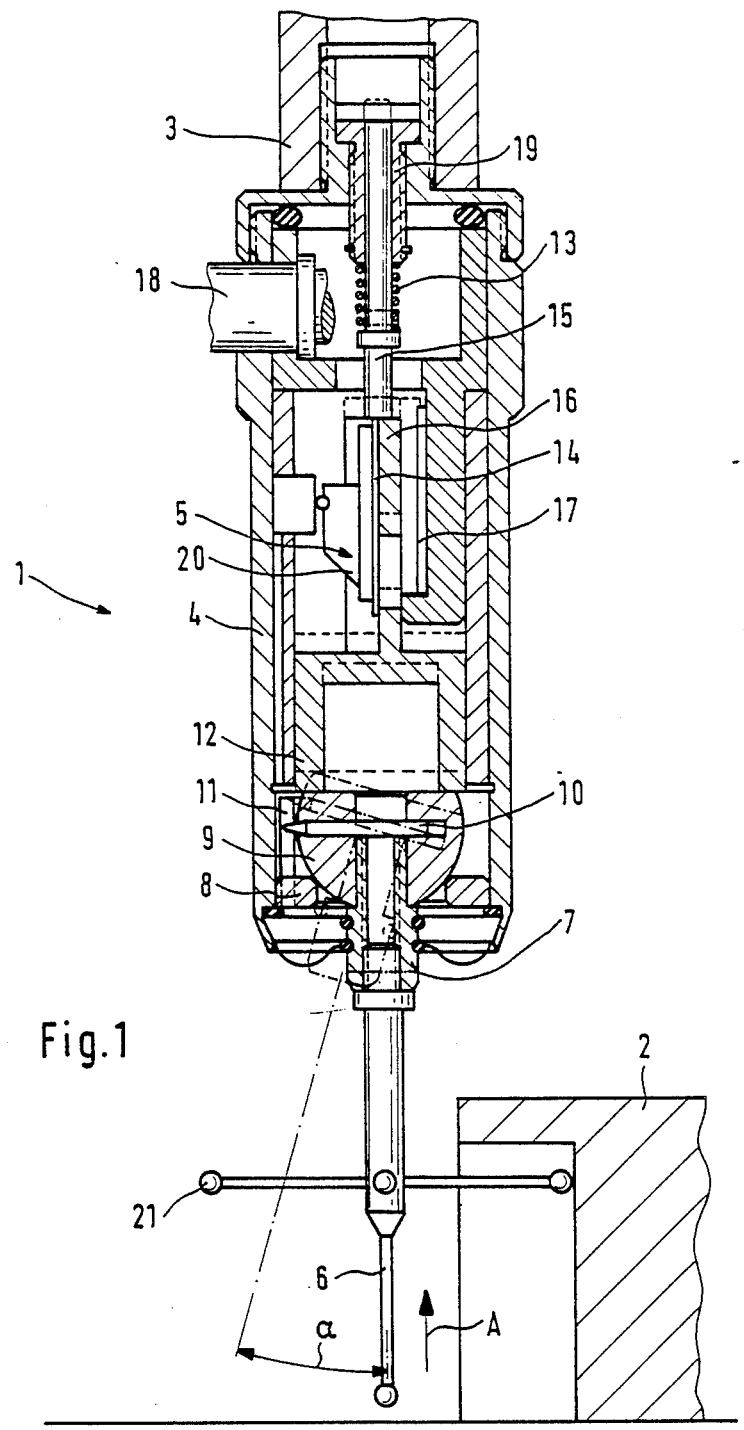
FIG. 1 is a view on an enlarged scale and in cross-section through one form of feeler device according to the invention.

As illustrated in FIG. 1, a feeler device 1 comprises a housing 4 which is preferably of a cylindrical configuration. At one end of the housing, the feeler device is clamped in a holder 3 which in turn can be secured to a co-ordinate measuring machine (not shown herein). FIG. 1 shows the feeler device 1 enlarged by a factor of about 2.5 times so that as will be apparent, the components must be disposed in a very small space with a high degree of precision.

Mounted a the lower end of the housing 4 of the feeler device is a deflectable member 7 carrying a feeler pin 6 for sensing a workpiece 2. The feeler pins are interchangeably secured to the deflectable member 7, for example by a screw connection, so that feeler pins of different configurations can be clamped in position. The illustrated embodiment shows a star-like feeler member with four individual pins in the horizontal plane and one pin in the axial direction. The ends of the individual pins are provided with feeler balls 21, consisting for example of ruby.

The deflectable member 7 is mounted in the device by means of a ball element 9 which is in the form of a portion of a ball. The ball element is pressed in the axial direction against a mounting means, as will be described in greater detail hereinafter with reference to FIGS. 2 to 4. A securing element 10 engages into a guide element 11 which is fixed with respect to the housing so that, as will be apparent, the feeler pin 6 cannot be turned. Broken lines represent the maximum deflection of the deflectable member 7, through an angle alpha. In a switching measurement mode, however, that deflection only serves to afford protection from collisions when quickly sensing the workpiece as the measurement result is already recorded at the smallest deflection of the feeler pin 6 and the feed for the feeler device is cut off.

A linearly slidable slider 12 is mounted in the interior of the housing 4. The slider 12 is substantially in the form of a circular ring and is pressed against the flat face of the portion of the ball by means of a spring force so that the portion of the ball always occupies a neutral starting position when the feeler pin is not subjected to a load. It will be seen that a pressure applied to the feeler pin from below in the direction indicated by the arrow A or any admissible deflection of the feeler pin results in linear sliding movement of the slider 12 in the direction indicated by the arrow A.

The linear movement is converted into a measurement pulse by means of a measuring element 5. The measuring element 5 may be of any suitable configuration, depending on the respective situation of use. It would be possible to envisage for example inductive or capacitive systems, piezoelectric elements, magnetic or optical mesuring and counting devices, and the like. The illustrated embodiment shows an incremental length measuring system as described, for example, in the present applicants, EP-A-237470 by the assignee of the present invention. In that arrangement, a light source 20 which is arranged at a stationary location projects a focussed light beam through a transparent measuring scale 14 which is provided wth regular graduations and which is fixed on a measuring scale carrier 16. The measuring scale carrier 16 is a continuation of the slider 12 and at its upper end is subjected to the action of a pin !5 which is biased under the force of the spring 13. In that arrangement the desired spring force acting on the pin 15 may be adjusted by means of an adjusting screw 19. The light pulses are recorded behind the scale 14 by means of a receiving device 17 and are passed to an amplifier and computer (not shown). The electrical connection to components outside the feeler device 1 is made by way of a cable output 18. It will be seen that in that way any deflection movement of the feeler pin 6 can be converted to an analog linear movement which can be detected and measured with a very high degree of precision.

Figure 2:
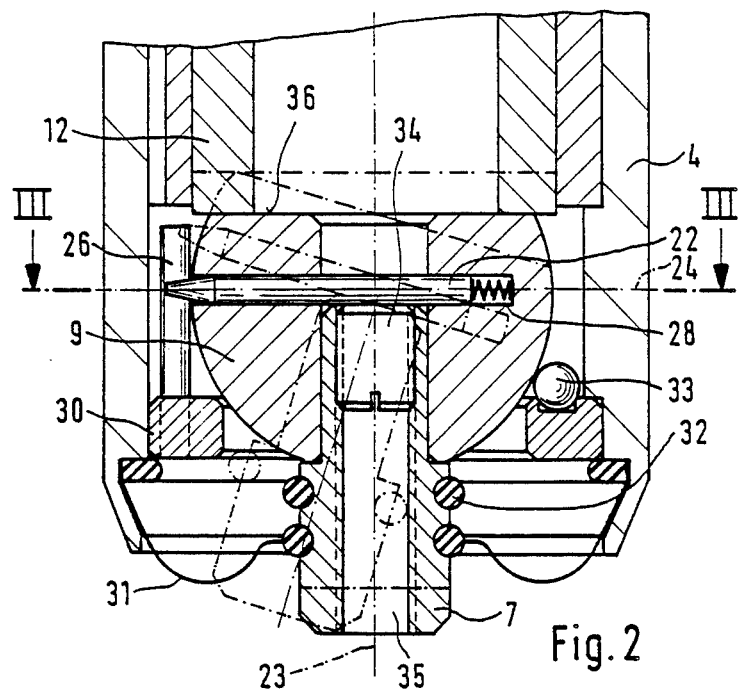
FIG. 2 is a view in cross-section through mounting means of a modified embodiment.
Figure 3:
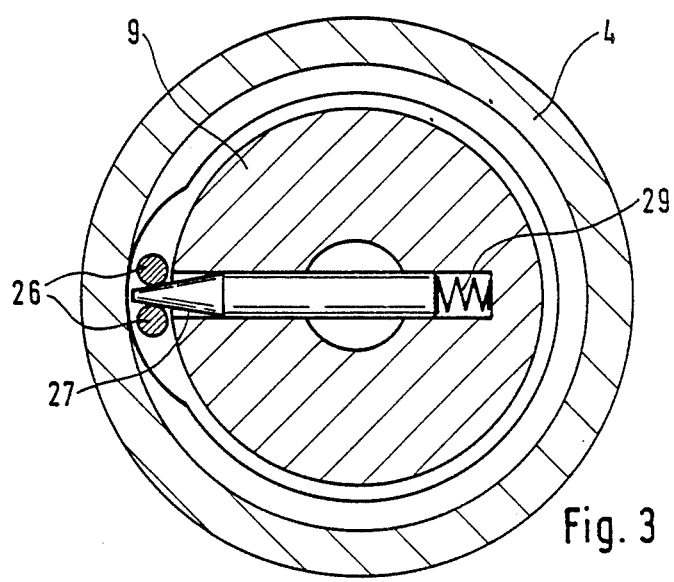
FIG. 3 is a view in horizontal section in plane III—III in FIG. 2 but with a somewhat modified cylindrical pin.
Figure 4:
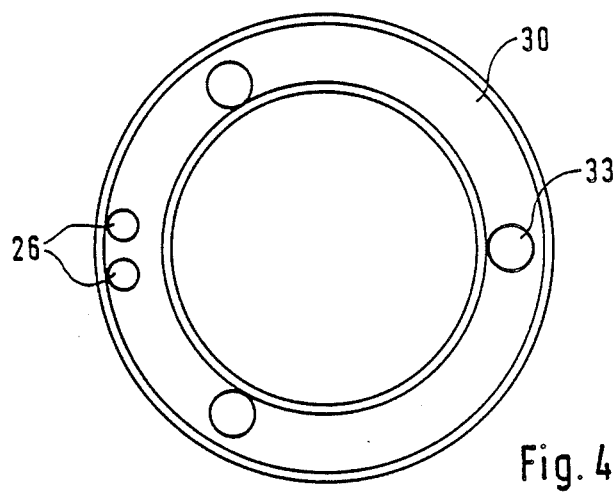
FIG. 4 is a plan view of the mounting means of the feeler device shown in FIG. 2.
Figure 5:
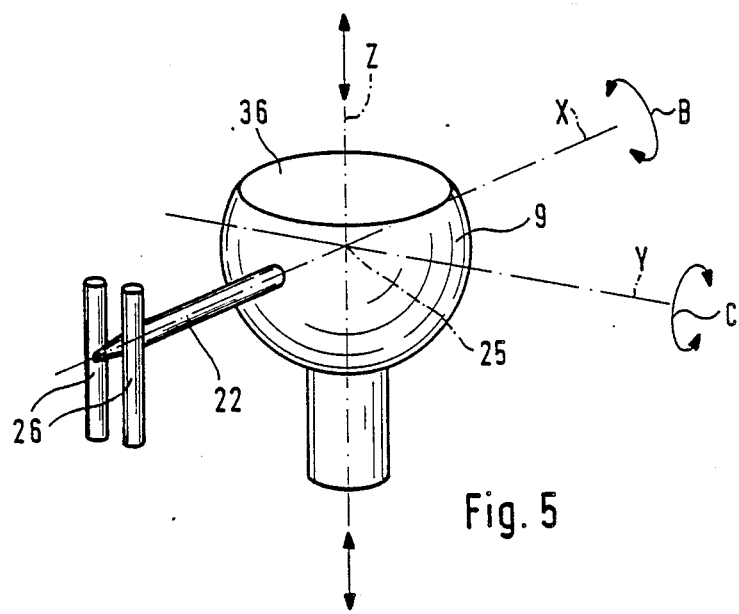
FIG. 5 is a simplified perspective view of a ball element showing three axes of movement.

FIGS. 2 to 4 show in somewhat greater detail the way in which the ball element 9 is mounted and guided, with the geometry of the movement involved being shown in FIG. 5. FIG. 2 again shows the deflectable member 7 at the lower end of the housing 4. The member 7 is force-lockingly connected to the ball element 9 which is in the form of a portion of a ball. It also has a screwthreaded bore 35 into which different feeler pin can be screwed. In order to prevent dirt and dust from passing into the mounting arrangement, the deflectable member 7 is sealed off relative to the housing 4 by an elastic bellows 31. An elastic buffer ring 32 also provides that the deflectable member 7 abuts softly against the ring 30.

The ball element 9 is pressed against the ring 3 which is pressed into the housing 4, by the slider 12 which engages against the flat surface 36. Unlike the embodiment shown in FIG. 1, however, the surface of the ball does not bear directly against the ring. On the contrary, the ring 30 is provided with mounting balls 33, for example of ruby, at equal angular spacings. The mounting balls 33, are disposed in depressions and are for example, fixedly glued to the ring. Alternatively, however, the balls could also be held in a mounting cage on the ring 30 and mounted rotatably on the ring 30. The arrangement of the mounting balls can be particularly clearly seen from FIG. 4.

Fixed in the ring 30 are two parallel cylindrical shaped members 26, the axes of which extend parallel to the center line 23 of the deflectable member 7 in the neutral starting position. Those shaped members may be, for example, high-precision machined hard metal or carbide metal pins or hardened metal pins. Arranged in the portion of the ball 9 transversely with respect to the center line 23 is a bore 28 whose center line passes precisely through the center 25 of the ball (FIG. 5). A cylindrical pin 22 is mounted axially slideably and without play in the bore 28. The slideable cylindrical pin 22 has a cone portion at its end which projects out of the ball and is pressed against the two cylindrical shaped members 26 by means of a spring 29 in the bore 28.

It will be seen that the cone portion 27 performs an arcuate movement relative to the shaped members 26 upon deflection of the feeler pin. If the feeler pin 22 remains fixed in the ball element, then the cone portion 27 is centered between the two shaped members 26 only in the neutral position while it moves away from the shaped members with increasing arcuate movement. As already mentioned, that centering effect in the neutral starting position is sufficient when the measuring machine is operating in accordance with a switching mode. In order exactly to define the neutral starting position as between the cone portion 27 and the shaped members 26, a grub screw 34 in the screwthreaded bore 35 is released in the neutral starting position. The grub screw 34 is then tightened s that the cylindrical pin 22 remains fixed in the bore 28. That procedure ensures that the pin 22 is always precisely centered without play by the shaped members 26 in the orginal neutral starting position.

In the mode of operation which involves permanent measurement, the grub screw 34 remains constantly loosened s that the pin 22 is centered by the shaped members 26 not only in the neutral starting position but also in any pivotal position.

FIG. 5 shows the co-ordinate system X-Y-Z in which the ball element 9 can move. When the feeler device is subjected to a precisely axial force in the Z-direction, the cylindrical pin 22 is displaced between the two guide members 26 without a variation in the right angle beween the cylindrical pin 22 and the shaped members 26. As the axis of the cylindrical pin 22 passes precisely through the center point 25 of the ball element, the pin 22 can rotate about its own axis upon deflection of the ball element 9 in the Y-direction, in the direction indicated by the arrow B. It will be seen that, in that situation, there is also no variation in angle between the pin 22 and the shaped members 26. If, on the other hand, the ball element is deflected in the X-direction, then the result is a rotary movement about the center point 25 of the ball element in the direction indicated by the arrow C, with a change in the angle between the cylindrical pin 22 and the guide members 26.

We claim:

1. A feeler device for forming a measurement value when sensing a workpiece, said feeler device comprising:
  a housing;
  means at one end of said housing for securing said housing to an actuating mechanism;
  a measuring element mounted inside said housing;
  annular mounting means fixed adjacent the opposite end of said housing for supporting a ball element within said housing for swivelling movement relatively thereto;
  a carrying member axially fixed to said ball element;
  at least one feeler pin fixed to said carrying member and projecting outside said housing;
  means for yieldingly pressing said ball element against said mounting means;
  means for activating said measuring element according to movement of said ball element from a neutral position thereof;
  a guide element fixed to and extending along said housing in the vicinity of said ball element; and
  a securing element extending out of said ball element to engage said guide element to prevent said feeler pin from turning said ball element at least in said neutral position thereof, said securing element comprising a cylindrical pin whose axis extends at a right angle to an axis of said carrying member through a center point of said ball element.

2. A feeler device according to claim 1, in which said guide element comprises two parallel shaped members between which said cylindrical pin engages at least in said neutral position of said ball element.

3. A feeler device according to claim 1, in which said guide element comprises two parallel cylindrical members and said cylindrical pin is formed with a conical point that engages between said cylindrical members at least in said neutral position of said ball element.

4. A feeler device according to claim 1 in which said ball element is formed with a bore in which said cylindrical pin is axially slidably mounted, the feeler device further including a spring mounted in said bore to bias said cylindrical pin towards said guide element.

5. A feeler device according to claim 1, in which said guide element comprises two parallel cylindrical members fixed to said annular mounting means and between which said pin engages at least in said neutral position of said ball element.

6. A feeler device according to claim 1, in which said ball element is supported directly by said annular mounting means but is separable therefrom against the action of said yieldable pressing means.

7. A feeler device according to claim 1, in which said annular mounting means comprises at least three mounting balls against which said ball element bears when supported by said annular mounting means.

8. A feeler device according to claim 1, in which said means for activating said measuring element includes a slider mounted to slide linearly in said housing between said pressing means and said ball element, said ball element being formed with a flat surface against which said slider bears whereby said slider will take up different positions relating respectively to different positions of said ball element during the operation of the device.

9. A feeler device according to claim 1, in which said ball element is formed with a bore in which said cylindrical pin is axially slidably mounted, the feeler device further including a spring mounted in said bore to bias said cylindrical pin towards said guide element and a screw mounted for fixing said cylindrical pin in a selected one of a range of possible positions thereof.

10. A feeler device according to claim 1, in which said carrying member is formed with an axial screwthreaded bore and said feeler pin is formed with a screwthread screwed into said screwthreaded bore, and said ball element is formed with a plain bore in which said cylindrical pin is axially slidably mounted, the feeler device further including a grub screw screwed into said screwthreaded bore beyond said feeler pin and arranged to lock said cylindrical pin in said plain bore.

11. A feeler device for forming a measurement value when sensing a workpiece, said feeler device comprising:
   a housing;
   means at one end of said housing for securing said housing to an actuating mechanism;
   a measuring element mounted inside said housing;
   annular mounting means fixed adjacent the opposite end of said housing for supporting a ball element within said housing for swivelling movement relatively thereto, said annular mounting means comprising a ring secured by pressing it into said opposite end of said housing;
   a carrying member axially fixed to said ball element;
   at least one feeler pin fixed to said carrying member and projecting outside said housing;
   means for yieldingly pressing said ball element against said mounting means;
   means for yieldingly pressing said ball element against said mounting means;
   means for activating said measuring element according to movement of said ball element from a neutral position thereof;
   a guide element fixed to and extending along said housing in the vicinity of said ball element; and
   a securing element extending out of said ball element to engage said guide element to prevent said feeler pin from turning said ball element at least in said neutral position thereof.

* * * * *